US011668119B2

(12) United States Patent
Kulicki

(10) Patent No.: US 11,668,119 B2
(45) Date of Patent: Jun. 6, 2023

(54) COUPLER-ACTUATOR ASSEMBLY FOR A POWERED LATCH SYSTEM

(71) Applicant: Volvo Car Corporation, Gothenburg (SE)

(72) Inventor: Piotr Kulicki, Lindome (SE)

(73) Assignee: Volvo Car Corporation, Gothenburg (SE)

( * ) Notice: Subject to any disclaimer, the term of this patent is extended or adjusted under 35 U.S.C. 154(b) by 664 days.

(21) Appl. No.: 16/693,480

(22) Filed: Nov. 25, 2019

(65) Prior Publication Data

US 2020/0340276 A1 Oct. 29, 2020

Related U.S. Application Data

(60) Provisional application No. 62/837,228, filed on Apr. 23, 2019.

(51) Int. Cl.
*E05B 79/12* (2014.01)
*E05B 81/06* (2014.01)
(Continued)

(52) U.S. Cl.
CPC ............... *E05B 81/16* (2013.01); *B60R 7/04* (2013.01); *E05B 79/12* (2013.01); *E05B 81/06* (2013.01);
(Continued)

(58) Field of Classification Search
CPC .......... E05B 81/00; E05B 81/02; E05B 81/04; E05B 81/06; E05B 81/12; E05B 81/16;
(Continued)

(56) References Cited

U.S. PATENT DOCUMENTS 4,833,465 A * 5/1989 Abend ................ E05B 47/0012
70/279.1
5,881,589 A * 3/1999 Clark .................. E05B 47/0012
70/333 R
(Continued)

FOREIGN PATENT DOCUMENTS

CN 107227905 A 10/2017
DE 102004015068 A1 10/2005
(Continued)

OTHER PUBLICATIONS

Computer Generated Translation for EP 2339100 A, Generated on Nov. 10, 2022, https://worldwide.espacenet.com/ (Year: 2022).*
(Continued)

*Primary Examiner* — Alyson M Merlino
(74) *Attorney, Agent, or Firm* — Clements Bernard Walker; Christopher L. Bernard

(57) ABSTRACT

Coupler-actuator assembly for a powered latch system of a hatch lid of a storage compartment of a vehicle, the coupler-actuator assembly including: a housing adapted to be disposed partially or wholly within and coupled to the hatch lid of the storage compartment or the storage compartment itself; a motor disposed partially or wholly within and coupled to the housing; an actuation mechanism disposed within the housing and coupled to the motor; and one or more slider racks disposed partially or wholly within the housing and coupled to the actuation mechanism. The coupler-actuator assembly also includes one or more connecting rods coupled to the one or more slider racks. The coupler-actuator assembly further includes one or more latch assemblies coupled to the one or more connecting rods, wherein, when actuated, the one or more latch assemblies are adapted to release the hatch lid from/secure the hatch lid to the storage compartment.

15 Claims, 13 Drawing Sheets

(51) Int. Cl.
  *E05B 81/28*  (2014.01)
  *E05B 81/36*  (2014.01)
  *E05B 83/30*  (2014.01)
  *E05C 9/04*   (2006.01)
  *B60R 7/04*   (2006.01)
  *E05B 81/16*  (2014.01)

(52) U.S. Cl.
  CPC .............. *E05B 81/28* (2013.01); *E05B 81/36* (2013.01); *E05B 83/30* (2013.01); *E05C 9/041* (2013.01)

(58) Field of Classification Search
  CPC .......... E05B 81/18; E05B 81/24; E05B 81/26; E05B 81/28; E05B 81/32; E05B 81/34; E05B 81/36; E05B 83/28; E05B 83/30; E05B 79/10; E05B 79/12; E05B 47/00; E05B 47/0001; E05B 47/0012; E05B 2047/0014; E05B 2047/0015; E05B 2047/0016; E05B 2047/0018; E05B 2047/002; E05B 2047/0021; E05B 2047/0035; E05B 2047/0067; E05B 2047/0069; E05C 9/00; E05C 9/008; E05C 9/04; E05C 9/041; E05C 9/10; E05C 9/12; E05C 9/002; E05C 9/1825; E05C 9/1833; E05C 9/185; Y10T 292/08; Y10T 292/0801; Y10T 292/0834; Y10T 292/0836; Y10T 292/084; Y10T 292/0843; Y10T 292/0845; Y10T 292/1018; Y10T 292/1021; Y10T 292/0823; Y10T 292/0993; Y10T 292/306; Y10T 292/307; B60R 5/00; B60R 7/06; B60R 7/046; B60R 7/04; B60R 2011/0005; B60J 7/185; B60J 7/1851; B60J 7/1853; B60J 7/194
  See application file for complete search history.

(56) References Cited

U.S. PATENT DOCUMENTS

| | | | | |
|---|---|---|---|---|
| 9,874,047 | B2 * | 1/2018 | Milne | ................. H05K 5/0069 |
| 2009/0038352 | A1 | 2/2009 | Yamaguchi et al. | |
| 2012/0047807 | A1 | 3/2012 | Lee | |
| 2019/0063119 | A1 * | 2/2019 | Sic | .......... E05B 83/30 |
| 2019/0153769 | A1 * | 5/2019 | Ottolini | .................. E05F 15/70 |

FOREIGN PATENT DOCUMENTS

| | | | | |
|---|---|---|---|---|
| DE | 102006060098 A1 | 6/2008 | | |
| DE | 102014108659 A1 | 12/2015 | | |
| EP | 1369547 A1 * | 12/2003 | ............. | E05C 9/041 |
| EP | 2339100 A1 * | 6/2011 | ............. | E05C 9/041 |
| EP | 2848840 A1 | 3/2015 | | |
| GB | 2298227 A * | 8/1996 | ............. | E05C 9/041 |
| GB | 2554593 A | 4/2018 | | |
| JP | 03286076 A * | 12/1991 | | |
| JP | 6510001 B1 * | 5/2019 | | |
| KR | 1020130087453 A * | 8/2013 | | |
| KR | 1020150032922 A * | 3/2015 | | |

OTHER PUBLICATIONS

Sep. 7, 2020 European Search Report issued on International U.S. Appl. No. 20/164,900.

* cited by examiner

COUPLER-ACTUATOR ASSEMBLY FOR A POWERED LATCH SYSTEM

CROSS-REFERENCE TO RELATED APPLICATION

The present disclosure claims the benefit of priority of U.S. Provisional Patent Application No. 62/837,228, filed on Apr. 23, 2019, and entitled "COUPLER-ACTUATOR ASSEMBLY FOR A POWERED LATCH SYSTEM," the contents of which are incorporated in full by reference herein.

TECHNICAL FIELD

The present disclosure relates generally to the automotive field. More particularly, the present disclosure relates to a coupler-actuator assembly for a powered latch system for a storage compartment of a vehicle.

BACKGROUND

A latch system for a storage compartment of a vehicle, such as a glove compartment, a driver-side storage compartment, a passenger storage compartment, a rear compartment, etc., typically consists of a mechanical, spring-loaded actuation mechanism that serves to open/close a hatch lid with the pull of a handle, push of one or more buttons, rotation of a knob, or the like, thereby releasing/engaging an associated latch mechanism. The use of a plurality of retractable, spring-loaded latch bolts, as described herein, is rather uncommon and has some specific characteristics. For example, such a latch system does not require a spring-loaded coupler, does not perform a return movement after reaching an unlatched position, and retains a clearly-defined unlatched position corresponding to the associated hatch lid being open. As such a latch system is rather uncommon, there is no commonly-known powered latch system that exploits these characteristics. This deficiency is therefore remedied by the coupler-actuator assembly of the present disclosure.

SUMMARY

In various exemplary embodiments, the coupler-actuator assembly of the present disclosure integrates various functions related to operating a powered latch system in a single module, including: an actuator function—the actuation of the latch assembly to open the hatch lid; a coupler function—the synchronization of the movement of the opposed latch bolts; an illumination activation sensor function—the detection of when the hatch lid is open for the activation of storage compartment illumination; and a power supply timing function—the timing of the power supply needed for operation of the actuator assembly. In general, the coupler-actuator module is coupled to the associated latch modules of the hatch lid of the storage compartment via connecting rods, as described herein.

In one exemplary embodiment, the present disclosure provides a coupler-actuator assembly for a powered latch system of a hatch lid of a storage compartment of a vehicle, the coupler-actuator assembly including: a housing adapted to be disposed partially or wholly within and coupled to the hatch lid or within the storage compartment; a motor disposed partially or wholly within and coupled to the housing; an actuation mechanism disposed within the housing and coupled to the motor; and one or more slider racks disposed partially or wholly within the housing and coupled to the actuation mechanism. The coupler-actuator assembly also includes one or more connecting rods disposed outside of or partially within the housing and coupled to the one or more slider racks, wherein the one or more connecting rods are adapted to be disposed adjacent to or partially or wholly within the hatch lid or the storage compartment. The coupler-actuator assembly further includes one or more latch assemblies disposed outside of the housing and coupled to the one or more connecting rods, wherein the one or more latch assemblies are adapted to be disposed adjacent to or partially or wholly within and coupled to the hatch lid or the storage compartment, wherein, when actuated, the one or more latch assemblies are adapted to release the hatch lid from/secure the hatch lid to the storage compartment. Preferably, the coupler-actuator assembly includes a pair of connected slider racks, a pair of opposed connecting rods each coupled to a corresponding one of the pair of connected slider racks within the housing, and a pair of opposed latch assemblies each coupled to a corresponding one of the pair of opposed connecting rods outside of the housing. Preferably, the actuation mechanism includes: a worm screw coupled to the motor; a worm gear coupled to the worm screw; an actuating gear sector coupled to the worm gear along a common axis; a receiving gear sector adapted to be coupled to the actuating gear sector; and a synchronizing pinion coupled to the receiving gear sector along another common axis and coupled to the one or more slider racks; wherein rotation of the worm screw by the motor rotates the worm gear about the common axis, which rotates the actuating gear sector about the common axis, which selectively rotates the receiving gear sector about the another common axis, which selectively rotates the synchronizing pinion about the another common axis, which selectively translates the one or more slider racks in a direction into/out of the housing. Preferably, the coupler-actuator assembly further includes a sensor disposed within the housing and operable for sensing an actuation state of the actuation mechanism.

In another exemplary embodiment, the present disclosure provides a hatch lid assembly for a storage compartment of a vehicle, the hatch lid assembly including: a hatch lid; and a coupler-actuator assembly, including: a housing disposed partially or wholly within and coupled to the hatch lid; a motor disposed partially or wholly within and coupled to the housing; an actuation mechanism disposed within the housing and coupled to the motor; and one or more slider racks disposed partially or wholly within the housing and coupled to the actuation mechanism. The coupler-actuator assembly also includes one or more connecting rods disposed outside of or partially within the housing and coupled to the one or more slider racks, wherein the one or more connecting rods are disposed adjacent to or partially or wholly within the hatch lid. The coupler-actuator assembly further includes one or more latch assemblies disposed outside of the housing and coupled to the one or more connecting rods, wherein the one or more latch assemblies are disposed adjacent to or partially or wholly within and coupled to the hatch lid, wherein, when actuated, the one or more latch assemblies are adapted to release the hatch lid from/secure the hatch lid to the storage compartment. Preferably, the coupler-actuator assembly includes a pair of connected slider racks, a pair of opposed connecting rods each coupled to a corresponding one of the pair of connected slider racks within the housing, and a pair of opposed latch assemblies each coupled to a corresponding one of the pair of opposed connecting rods outside of the housing. Preferably, the actuation mechanism includes: a worm screw coupled to the motor; a worm gear coupled to the worm screw; an actuating gear sector coupled to the worm gear along a common axis; a receiving gear sector adapted to be coupled to the actuating gear sector; and a synchronizing pinion coupled to the receiving gear sector along another common axis and coupled to the one or more slider racks; wherein rotation of the worm screw by the motor rotates the worm gear about the common axis, which rotates the actuating gear sector about the common axis, which selectively rotates the receiving gear sector about the another common axis, which selectively rotates the synchronizing pinion about the another common axis, which selectively translates the one or more slider racks in a direction into/out of the housing. Preferably, the coupler-actuator assembly further includes a sensor disposed within the housing and operable for sensing an actuation state of the actuation mechanism.

In a further exemplary embodiment, the present disclosure provides a storage compartment assembly for a vehicle, the storage compartment assembly including: a storage compartment; a hatch lid pivotably or removably coupled to the storage compartment; and a coupler-actuator assembly, including: a housing disposed partially or wholly within the storage compartment; a motor disposed partially or wholly within and coupled to the housing; an actuation mechanism disposed within the housing and coupled to the motor; and one or more slider racks disposed partially or wholly within the housing and coupled to the actuation mechanism. The coupler-actuator assembly also includes one or more connecting rods disposed outside of or partially within the housing and coupled to the one or more slider racks, wherein the one or more connecting rods are disposed adjacent to or partially or wholly within the hatch lid or the storage compartment. The coupler-actuator assembly further includes one or more latch assemblies disposed outside of the housing and coupled to the one or more connecting rods, wherein the one or more latch assemblies are disposed adjacent to or partially or wholly within and coupled to the hatch lid or the storage compartment, wherein, when actuated, the one or more latch assemblies are adapted to partially or wholly release the hatch lid from/secure the hatch lid to the storage compartment. Preferably, the coupler-actuator assembly includes a pair of connected slider racks, a pair of opposed connecting rods each coupled to a corresponding one of the pair of connected slider racks within the housing, and a pair of opposed latch assemblies each coupled to a corresponding one of the pair of opposed connecting rods outside of the housing. Preferably, the actuation mechanism includes: a worm screw coupled to the motor; a worm gear coupled to the worm screw; an actuating gear sector coupled to the worm gear along a common axis; a receiving gear sector adapted to be coupled to the actuating gear sector; and a synchronizing pinion coupled to the receiving gear sector along another common axis and coupled to the one or more slider racks; wherein rotation of the worm screw by the motor rotates the worm gear about the common axis, which rotates the actuating gear sector about the common axis, which selectively rotates the receiving gear sector about the another common axis, which selectively rotates the synchronizing pinion about the another common axis, which selectively translates the one or more slider racks in a direction into/out of the housing. Preferably, the coupler-actuator assembly further includes a sensor disposed within the housing and operable for sensing an actuation state of the actuation mechanism.

BRIEF DESCRIPTION OF THE DRAWINGS

The present disclosure is illustrated and described with reference to the various drawings, in which like reference numbers are used to denote like assembly components/method steps, as appropriate, and in which.

DESCRIPTION OF EMBODIMENTS

Again, in various exemplary embodiments, the coupler-actuator assembly of the present disclosure integrates various functions related to operating a powered latch system in a single module, including: an actuator function—the actuation of the latch assembly to open the hatch lid; a coupler function—the synchronization of the movement of the opposed latch bolts; an illumination activation sensor function—the detection of when the hatch lid is open for the activation of storage compartment illumination; and a power supply timing function—the timing of the power supply needed for operation of the actuator assembly. In general, the coupler-actuator module is coupled to the associated latch modules of the hatch lid of the storage compartment via connecting rods, as described herein. It should be noted that the latch modules and connecting rods may be considered part of a broader latch assembly.

Figure 1:
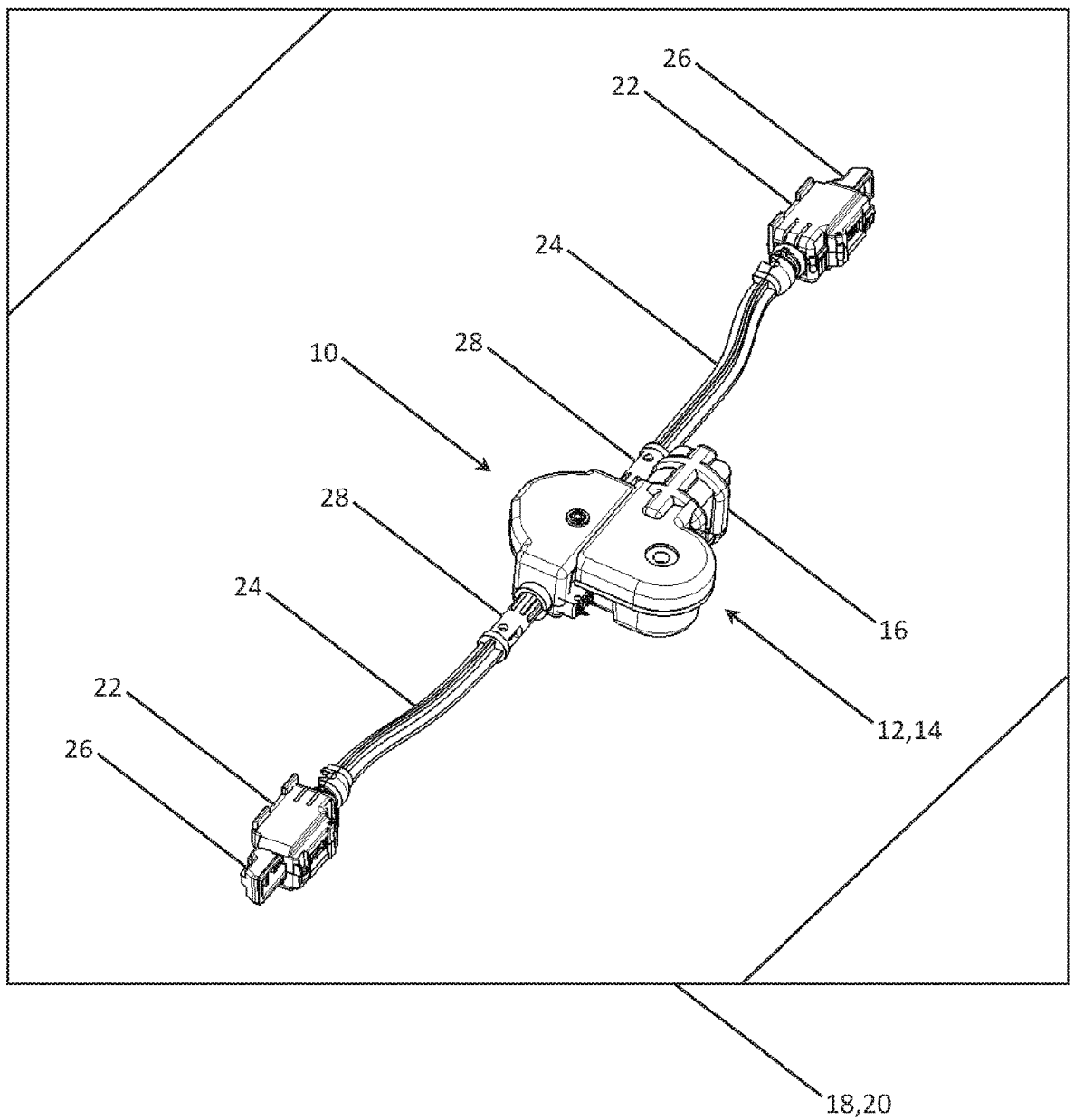
FIG. 1 is a perspective view of one exemplary embodiment of the coupler-actuator assembly for a powered latch system of the present disclosure, coupled to a pair of latch modules of the hatch lid of a storage compartment of a vehicle via connecting rods.

Referring now specifically to FIG. 1, in general, the coupler-actuator assembly 10 includes a housing 12 that encompasses an actuation mechanism 14. The actuation mechanism 14 is actuated using a direct-current (DC) electric motor 16 or the like coupled to an electronic controller and handle mechanism, button mechanism, knob mechanism, or the like that is selectively actuated by a user to open/close the hatch lid 18 of the associated storage compartment 20. The electronic controller and handle mechanism, button mechanism, knob mechanism, or the like are well known to those of ordinary skill in the art and are not described in greater detail herein. Likewise, the hatch lid 18 and storage compartment 20 are well known to those of ordinary skill in the art and are not described in greater detail herein. The housing 12 is coupled to either the hatch lid 18 or the storage compartment 20. For example, the housing 12 may be disposed within an interior of the hatch lid 18 or a wall of the storage compartment 20, and especially an upper wall of the storage compartment, with the electronic controller and handle mechanism, button mechanism, knob mechanism, or the like engaging the actuation mechanism 14 through an exterior surface of the hatch lid 18 or the wall of the storage compartment 20. Advantageously, the coupler-actuator assembly 10 utilizes a low-profile design such that minimal thickness is required with respect to the hatch lid 18 and minimal space is occupied within the storage compartment 20, depending on the preferred placement of the coupler-actuator assembly 10.

The actuation mechanism 14 is coupled to the associated latch assembly or assemblies 22 via one or more connecting rods 24. FIG. 1 shows a preferred embodiment, with a pair of opposed latch assemblies 22 and connected rods 24 being utilized, although a single latch assembly 22 and connecting rod 24 could also be utilized, as could greater numbers. The connecting rods 24 are substantially rigid structures that transmit translational motion from the actuation mechanism 14 to the latch assemblies 22, although substantially flexible structures could also be used for this purpose, such as pushrods operating in flexible (but constrained) channels. Likewise, the connecting rods 24 could convert this translational motion to rotational motion at the latch assemblies 22 themselves. The latch assemblies 22 consist of devices that take the translational motion (or rotational motion) and use it to retract/deploy latch structures 26 into/onto/from recesses or protruding structures of the hatch lid 18 or the storage compartment 20, such that the hatch lid 18 is selectively released from/secured to the storage compartment or an adjacent structure, as is done conventionally. The latch structures 26 could also be magnetic retention devices, for example. The latch assemblies 22 are coupled to either the hatch lid 18 or the storage compartment 20, coincident with the housing 12. For example, the latch assemblies 22 may also be disposed within an interior of the hatch lid 18 or the wall of the storage compartment 20, and especially an upper wall of the storage compartment, with the latch structures 26 protruding or exposed through the exterior surface of the hatch lid 18 or the wall of the storage compartment 20, where they are selectively mated with a recess r protruding structure associated with the other component. Again, advantageously, the latch assemblies 22 utilize a low-profile design such that minimal thickness is required with respect to the hatch lid 18 and minimal space is occupied within the storage compartment 20, depending on the preferred placement of the coupler-actuator assembly 10 and the latch assemblies 22. In the exemplary embodiment illustrated, the connecting rods 24 are shown connected to the actuation mechanism 14 using slider racks 28 that protrude from the housing 12. These slider racks 28 could also be disposed entirely within the housing 12, form integral parts of the connecting rods 24, etc., provided that the same functionality results, as described in greater detail herein.

Figure 2:
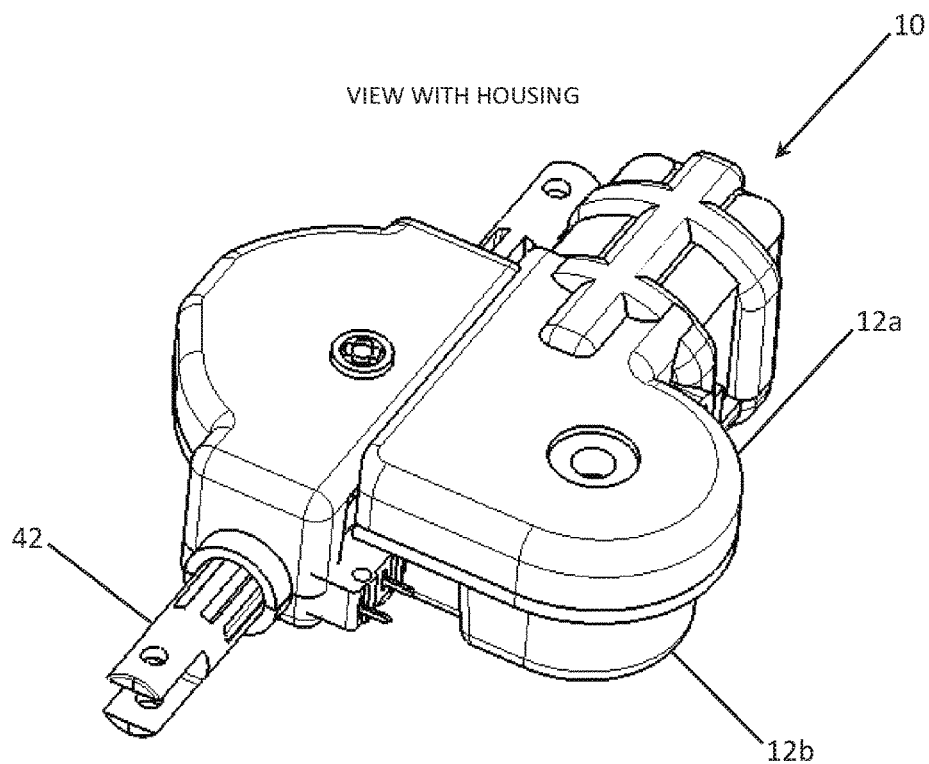
FIG. 2 is a perspective view of one exemplary embodiment of the coupler-actuator assembly for a powered latch system of the present disclosure, with and without the associated housing attached for clarity.
Figure 2:
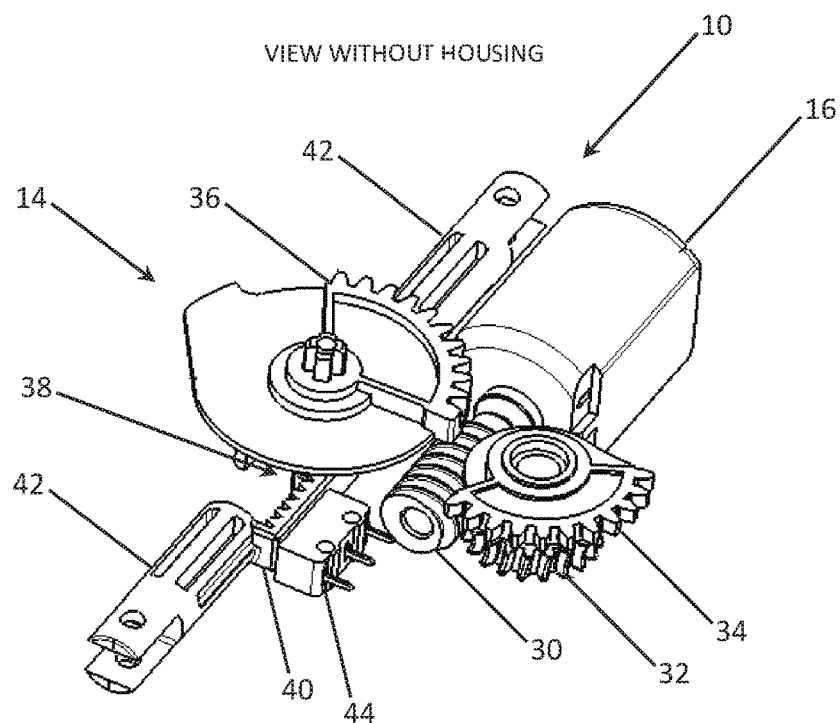

Referring now specifically to FIG. 2, in one exemplary embodiment, the housing 12 includes an upper housing 12a and a lower housing 12b collectively disposed about the actuation mechanism 14. The coupler-actuator assembly 10 employs a simple DC electric motor 16, completely enclosed within the housing 12 in this case. A worm screw 30 is fixed on the shaft of the motor 16 and rotates when the motor 16 is actuated. The worm screw 30 is coupled to a corresponding worm gear 32 disposed on a shaft disposed substantially perpendicular to the worm screw 30. Thus, the worm screw 30 and worm gear 32 effectively decrease the rotational speed increase the torque of the motor 16 available to the actuation mechanism 14. An actuating gear sector 34 is disposed on the same shaft as the worm gear 32. The actuating gear sector 34 is only partially-toothed and performs one rotation per opening cycle. It should be noted that all of the components described herein may be manufactured from any suitable substantially rigid material, such as a metallic material, a plastic material, or the like.

The actuating gear sector 34 engages a corresponding receiving gear sector 36 when rotated. The receiving gear sector 36 is also only partially-toothed and is fixed on a common shaft with a synchronizing pinion 38. The receiving gear sector/pinion shaft is disposed substantially parallel to the actuating gear sector/worm gear shaft within the housing 12. As shown, the receiving gear sector 36 may be keyed and fitted on a corresponding keyed portion of the pinion 38. The pinion 38 also includes teeth at its center portion that engage corresponding teeth of a pair of slider racks 40 disposed adjacent to and about the pinion 38. Here, one slider rack 40 is disposed on each opposed side of the pinion 38, with the slider racks 40 simultaneously engaging the pinion 38. The slider racks 40 are ultimately coupled to the connecting rods 24 (FIG. 1) of the coupler-actuator assembly 10.

In operation, rotation of the worm screw 30 by the motor 16 rotates the worm gear 32 about the first axis, which rotates the actuating gear sector 34 about the first axis. This selectively rotates the receiving gear sector 36 about the second axis, due to the partially-toothed nature of both the actuating gear sector 34 and the receiving gear sector 36, which rotates the pinion 38 about the second axis. Rotation of the pinion 38 about the second axis translates the slider racks 40 in a direction into/out of the housing 12. As shown, the slider racks 40 each include a connecting rod engagement portion 42 that protrudes from or is enclosed within the housing 12 and is coupled to the corresponding connecting rod 24 via a pin attachment, for example. It will be readily apparent to those of ordinary skill in the art that slightly different gear and component arrangements and configurations can be utilized equally. For example, a linear motor could be utilized, as opposed to a rotational motor, requiring different gear and lever connections to be utilized.

Preferably, a sensor switch 44 is disposed within the housing 12 and coupled to one of the moving components of the actuation mechanism 14, such as one of the slider racks 40. This sensor switch 44 is operable for sensing a degree of movement of the moving component and thereby monitoring an actuation state of the actuation mechanism 14. Such sensing devices are well known to those of ordinary skill in the art and may include mechanical sensors, near-field electrical sensors, or the like, sensing relative or absolute translational or rotational motion or displacement.

Figure 3:
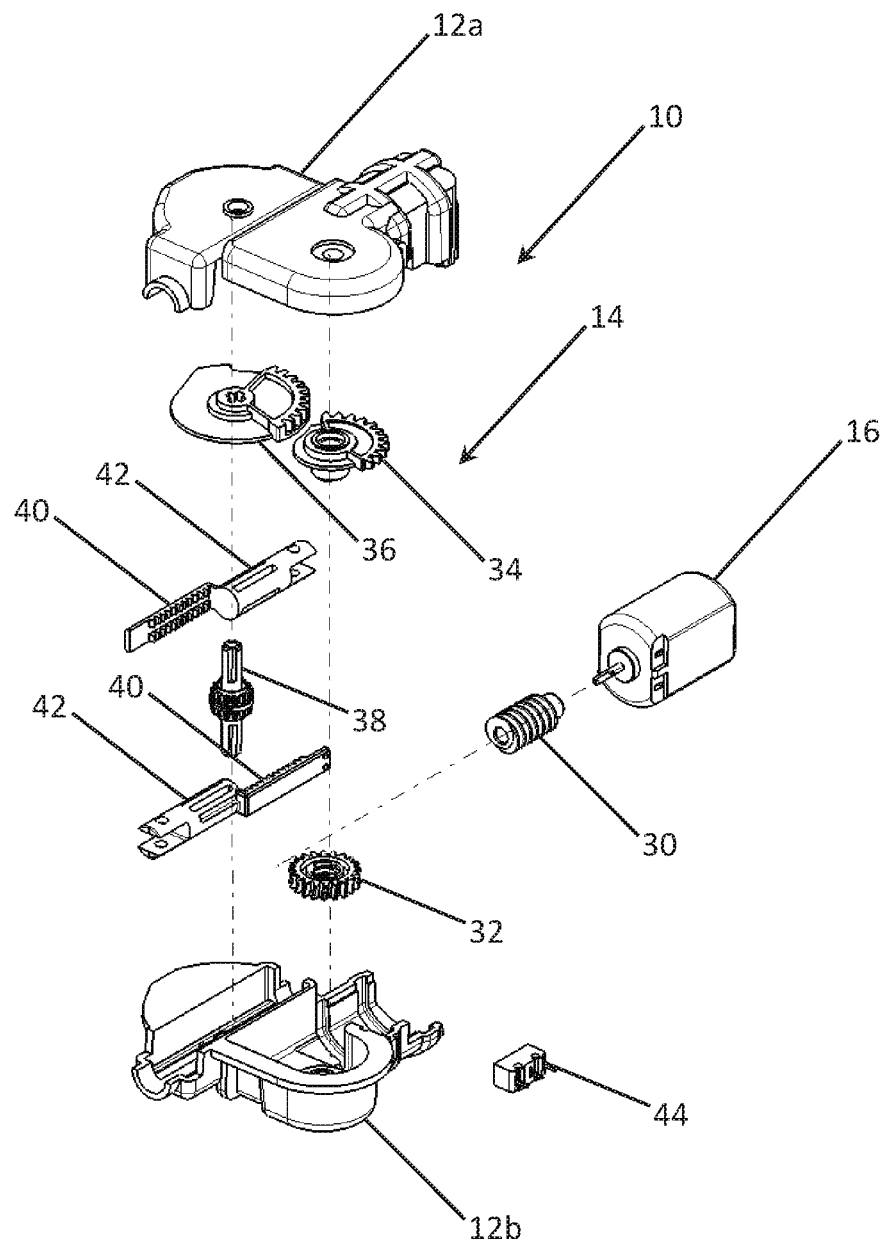
FIG. 3 is an exploded perspective view of one exemplary embodiment of the coupler-actuator assembly for a powered latch system of the present disclosure.

Referring now specifically to FIG. 3, in a more clear exploded view, the housing 12 again includes an upper housing 12a and a lower housing 12b collectively disposed about the actuation mechanism 14. The coupler-actuator assembly 10 employs a simple DC electric motor 16, completely enclosed within the housing 12 in this case. A worm screw 30 is fixed on the shaft of the motor 16 and rotates when the motor 16 is actuated. The worm screw 30 is coupled to a corresponding worm gear 32 disposed on a shaft disposed substantially perpendicular to the worm screw 30. Thus, the worm screw 30 and worm gear 32 effectively decrease the rotational speed increase the torque of the motor 16 available to the actuation mechanism 14. An actuating gear sector 34 is disposed on the same shaft as the worm gear 32. The actuating gear sector 34 is only partially-toothed and performs one rotation per opening cycle. It should be noted that all of the components described herein may be manufactured from any suitable substantially rigid material, such as a metallic material, a plastic material, or the like.

The actuating gear sector 34 engages a corresponding receiving gear sector 36 when rotated. The receiving gear sector 36 is also only partially-toothed and is fixed on a common shaft with a synchronizing pinion 38. The receiving gear sector/pinion shaft is disposed substantially parallel to the actuating gear sector/worm gear shaft within the housing 12. As shown, the receiving gear sector 36 may be keyed and fitted on a corresponding keyed portion of the pinion 38. The pinion 38 also includes teeth at its center portion that engage corresponding teeth of a pair of slider racks 40 disposed adjacent to and about the pinion 38. Here, one slider rack 40 is disposed on each opposed side of the pinion 38, with the slider racks 40 simultaneously engaging the pinion 38. The slider racks 40 are ultimately coupled to the connecting rods 24 (FIG. 1) of the coupler-actuator assembly 10.

In operation, rotation of the worm screw 30 by the motor 16 again rotates the worm gear 32 about the first axis, which rotates the actuating gear sector 34 about the first axis. This selectively rotates the receiving gear sector 36 about the second axis, due to the partially-toothed nature of both the actuating gear sector 34 and the receiving gear sector 36, which rotates the pinion 38 about the second axis. Rotation of the pinion 38 about the second axis translates the slider racks 40 in a direction into/out of the housing 12. As shown, the slider racks 40 each include a connecting rod engagement portion 42 that protrudes from or is enclosed within the housing 12 and is coupled to the corresponding connecting rod 24 via a pin attachment, for example. It will be readily apparent to those of ordinary skill in the art that slightly different gear and component arrangements and configurations can be utilized equally. For example, a linear motor could be utilized, as opposed to a rotational motor, requiring different gear and lever connections to be utilized.

Preferably, a sensor switch 44 is again disposed within the housing 12 and coupled to one of the moving components of the actuation mechanism 14, such as one of the slider racks 40. This sensor switch 44 is operable for sensing a degree of movement of the moving component and thereby monitoring an actuation state of the actuation mechanism 14. Such sensing devices are well known to those of ordinary skill in the art and may include mechanical sensors, near-field electrical sensors, or the like, sensing relative or absolute translational or rotational motion or displacement.

Figure 4:
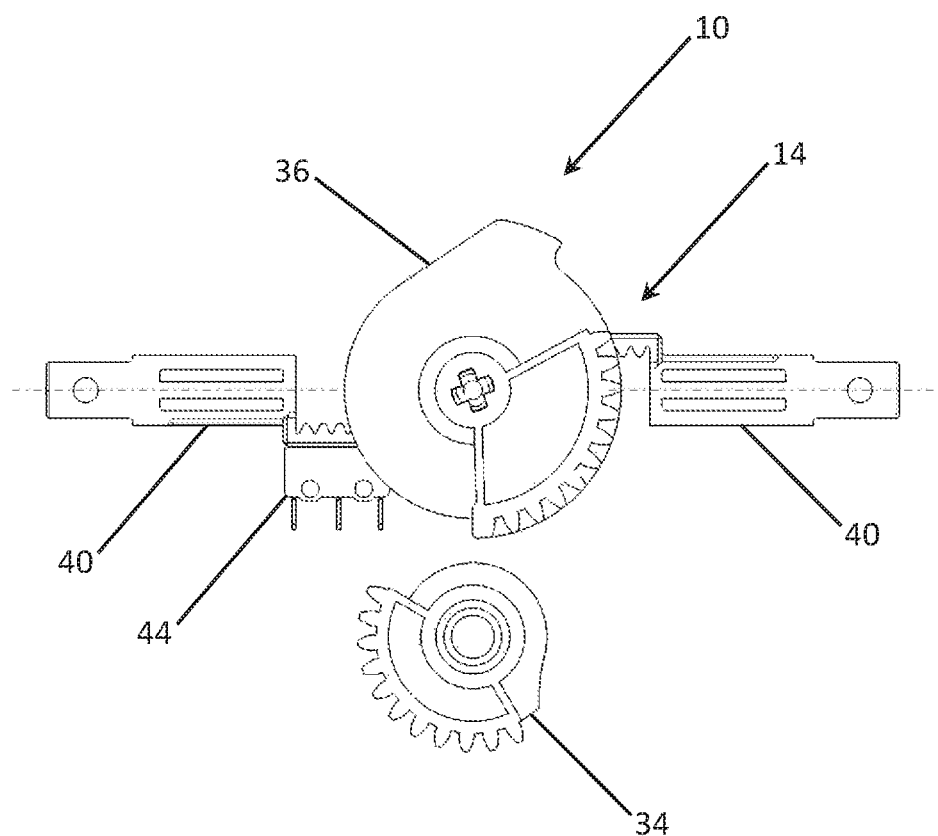
FIG. 4 is a partial top planar view of one exemplary embodiment of the coupler-actuator assembly for a powered latch system of the present disclosure, in a first actuated state.

FIG. 4 is a partial top planar view of one exemplary embodiment of the coupler-actuator assembly 10 for a powered latch system of the present disclosure, in a first actuated state. Here, the actuation mechanism 14 is in a normal (latched) position with the slider racks 40 extended. The motor 16 (FIGS. 1-3) is not powered up and the sensor switch 44 is in an open state.

Figure 5:
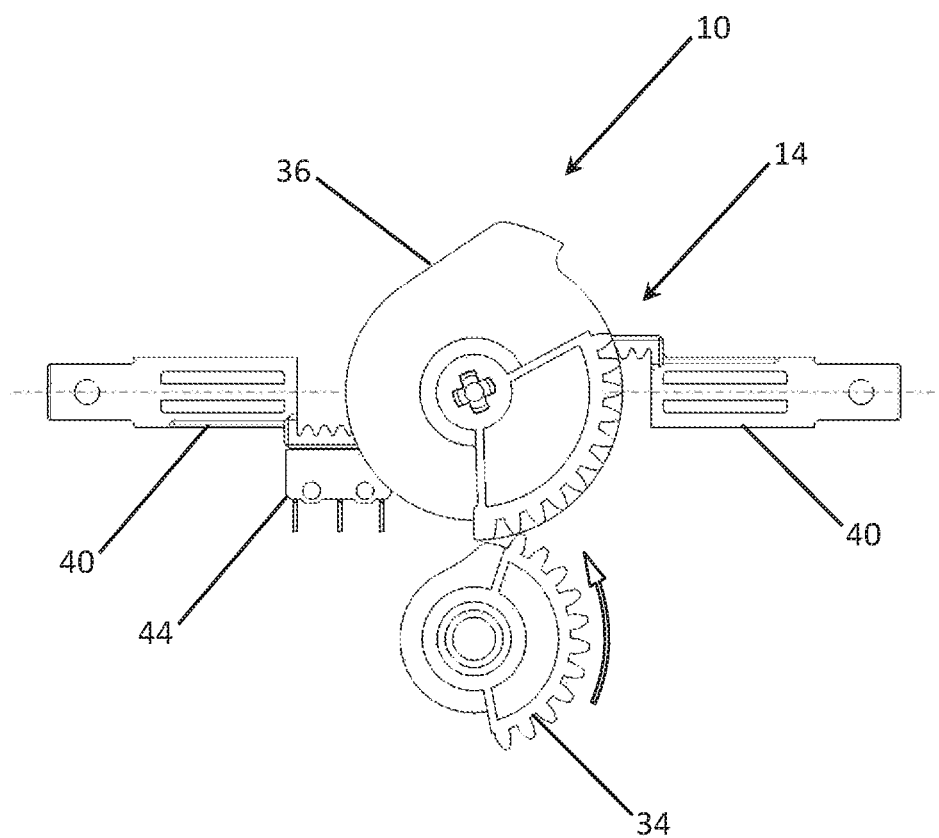
FIG. 5 is a partial top planar view of one exemplary embodiment of the coupler-actuator assembly for a powered latch system of the present disclosure, in a second actuated state.

FIG. 5 is a partial top planar view of one exemplary embodiment of the coupler-actuator assembly 10 for a powered latch system of the present disclosure, in a second actuated state. Here, the motor 16 (FIGS. 1-3) is powered up after a signal from the opening control (i.e., a sensor switch in the handle, push button, knob, or the like). The actuating gear sector 34 rotates until it engages the receiving gear sector 36.

Figure 6:
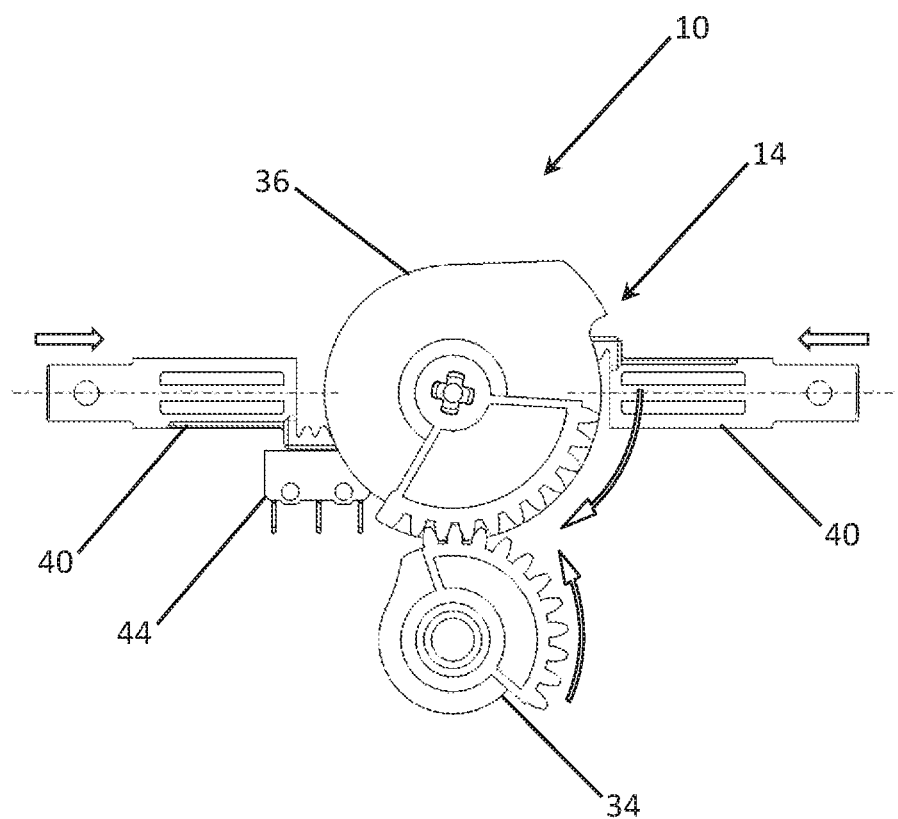
FIG. 6 is a partial top planar view of one exemplary embodiment of the coupler-actuator assembly for a powered latch system of the present disclosure, in a third actuated state.

FIG. 6 is a partial top planar view of one exemplary embodiment of the coupler-actuator assembly 10 for a powered latch system of the present disclosure, in a third actuated state. Here, further rotation of the actuating gear sector 34 is accompanied by a rotation of the receiving gear sector 36 (as they are meshed together). That, in turn, causes the pinion 38 (FIGS. 2 and 3) rotation and initiates the slider rack displacements.

Figure 7:
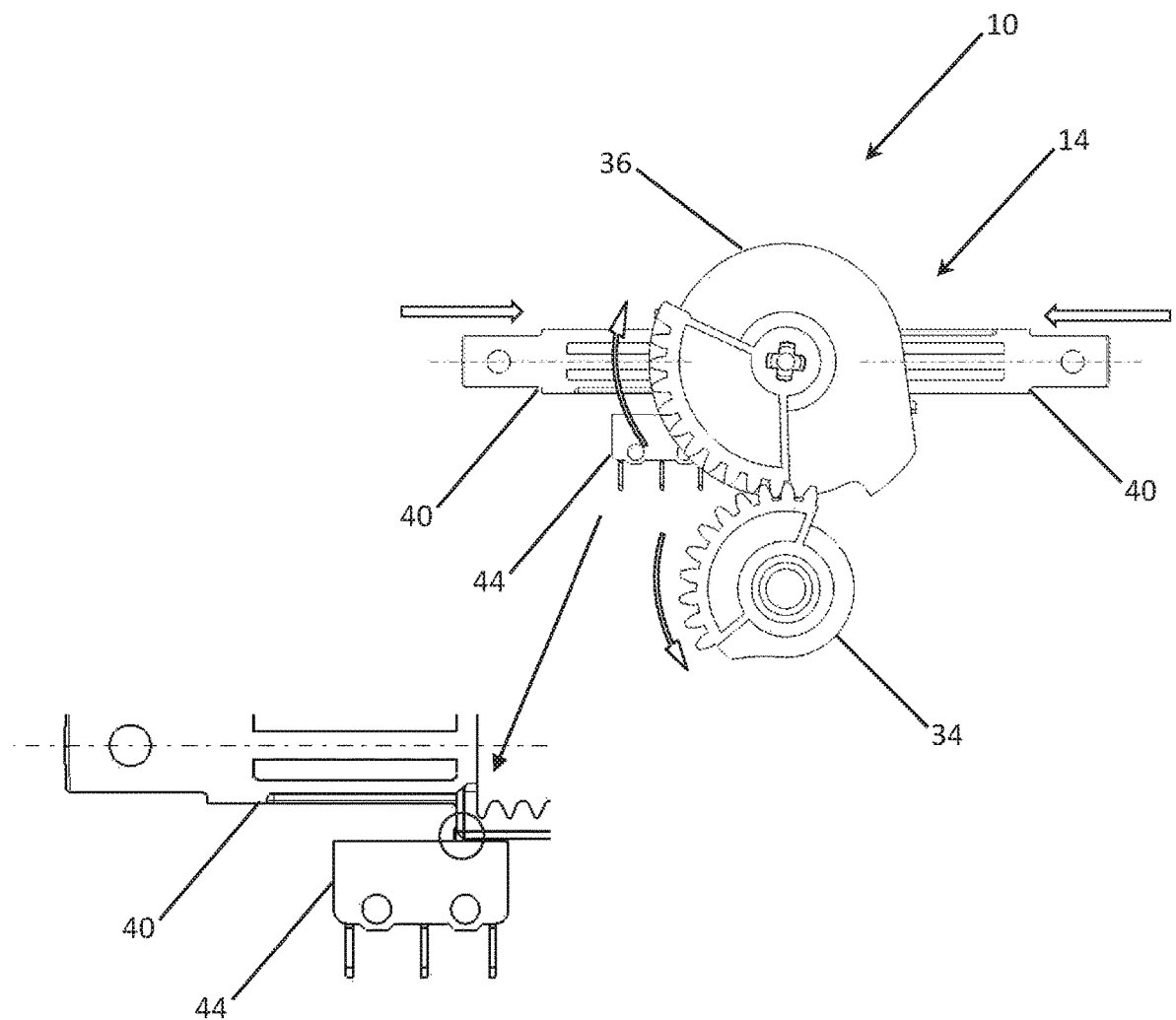
FIG. 7 is a partial top planar view of one exemplary embodiment of the coupler-actuator assembly for a powered latch system of the present disclosure, in a fourth actuated state.

FIG. 7 is a partial top planar view of one exemplary embodiment of the coupler-actuator assembly 10 for a powered latch system of the present disclosure, in a fourth actuated state. Here, after rotating a predefined angle, the actuating gear sector 34 disengages from the receiving gear sector 36. The slider racks 40 are now very close to their final, unlatched positions and the sensor switch 44 is about to be closed.

Figure 8:
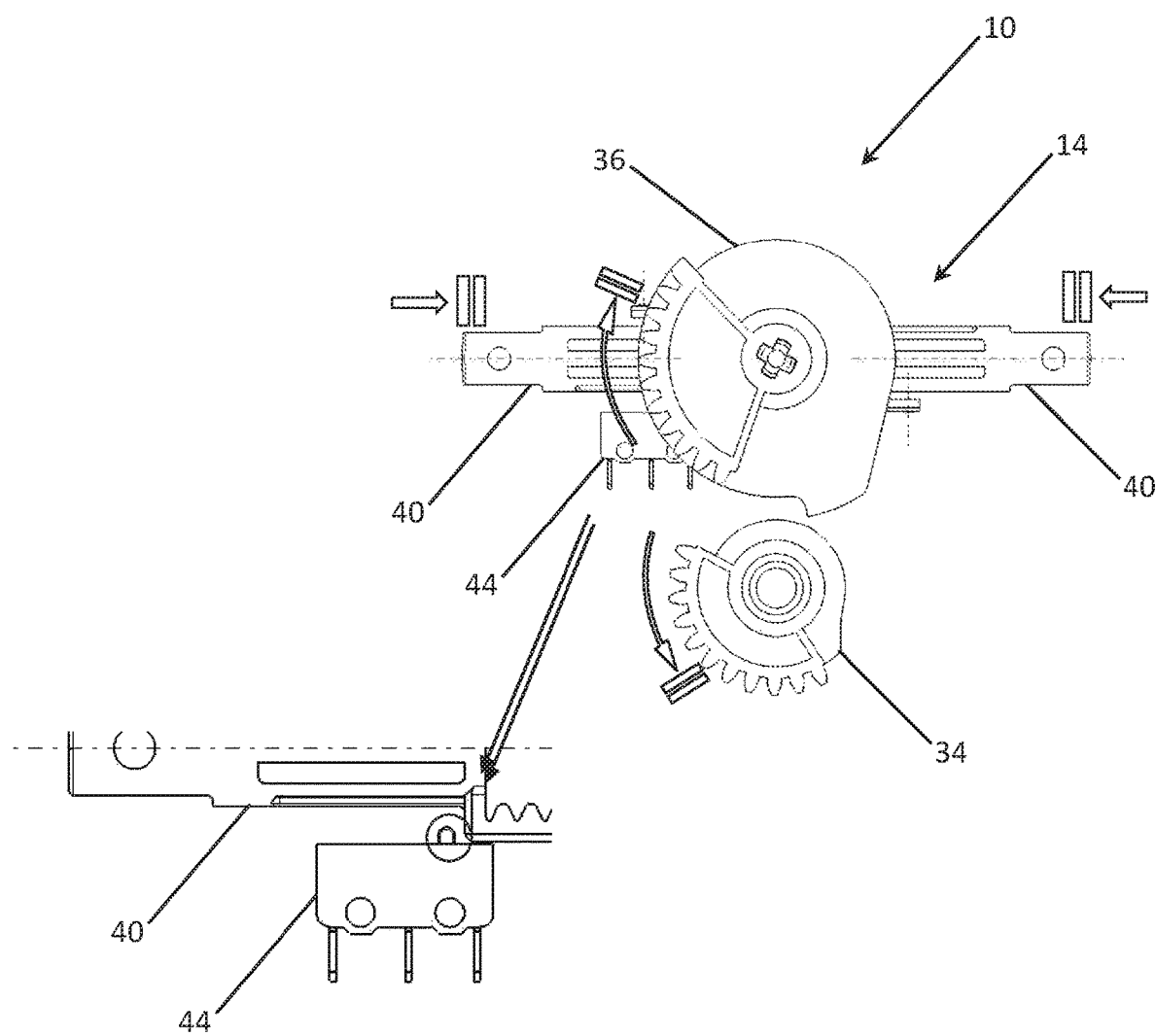
FIG. 8 is a partial top planar view of one exemplary embodiment of the coupler-actuator assembly for a powered latch system of the present disclosure, in a fifth actuated state.

FIG. 8 is a partial top planar view of one exemplary embodiment of the coupler-actuator assembly 10 for a powered latch system of the present disclosure, in a fifth actuated state. Here, the receiving gear sector 36 is disengaged from the actuating gear sector 34. The slider racks 40 move the last part of their travel and stop. This movement is helped by a force from the latching assemblies 22 (FIG. 1) settling in their unlatched positions. The sensor switch 44 is now closed and the power to the motor 16 (FIGS. 1-3) is cut. The actuating gear sector 34 now stops. It should be noted that, due to the inertia of the motor 16, the actuating gear sector 34 moves past the point where the power is cut. There is a mechanical position limiter for rotation such that there is no interference with the now free-running receiving gear sector 36. This would prevent the latch assemblies 22 from being extended (i.e., closed) again.

From an operational standpoint, the actuation provided is very fast (below 500 ms) and there is no need for resetting the position of the motor 16 (FIGS. 1-3) or any other components. This results in reduced operating noise duration, providing more of an "acoustic confirmation" than a "mechanical operating noise." This system function is more reliable than systems with arbitrary power supply timing. Indirectly, this also provides a minimized packaging volume and a maximized storage compartment volume.

Figure 9:
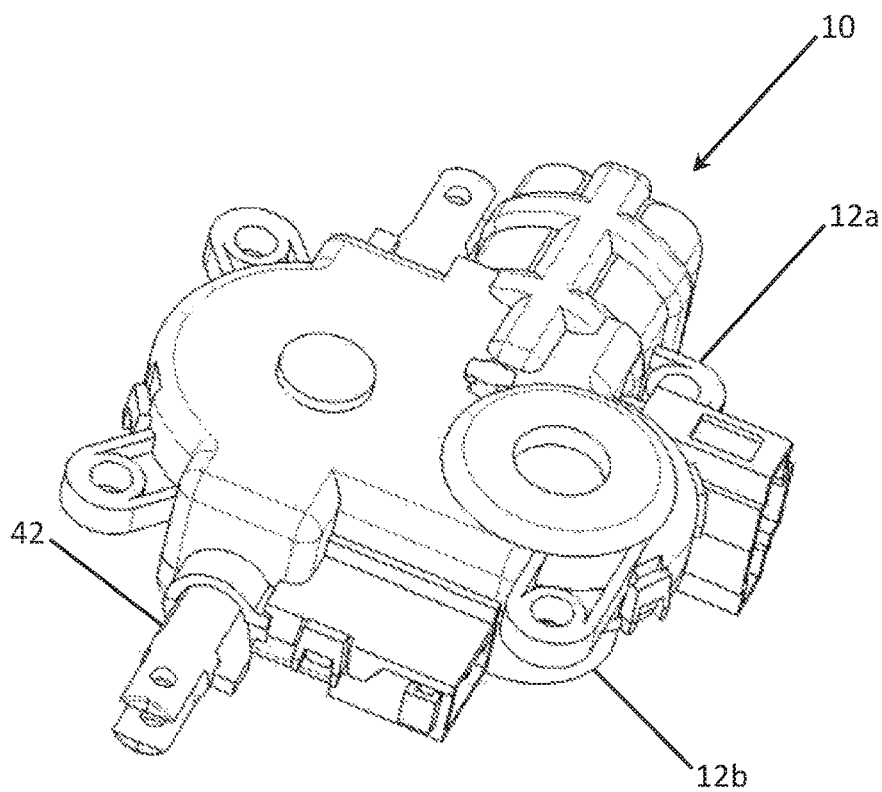
FIG. 9 is a perspective view of another exemplary embodiment of the coupler-actuator assembly for a powered latch system of the present disclosure, with and without the associated housing attached for clarity.
Figure 9:
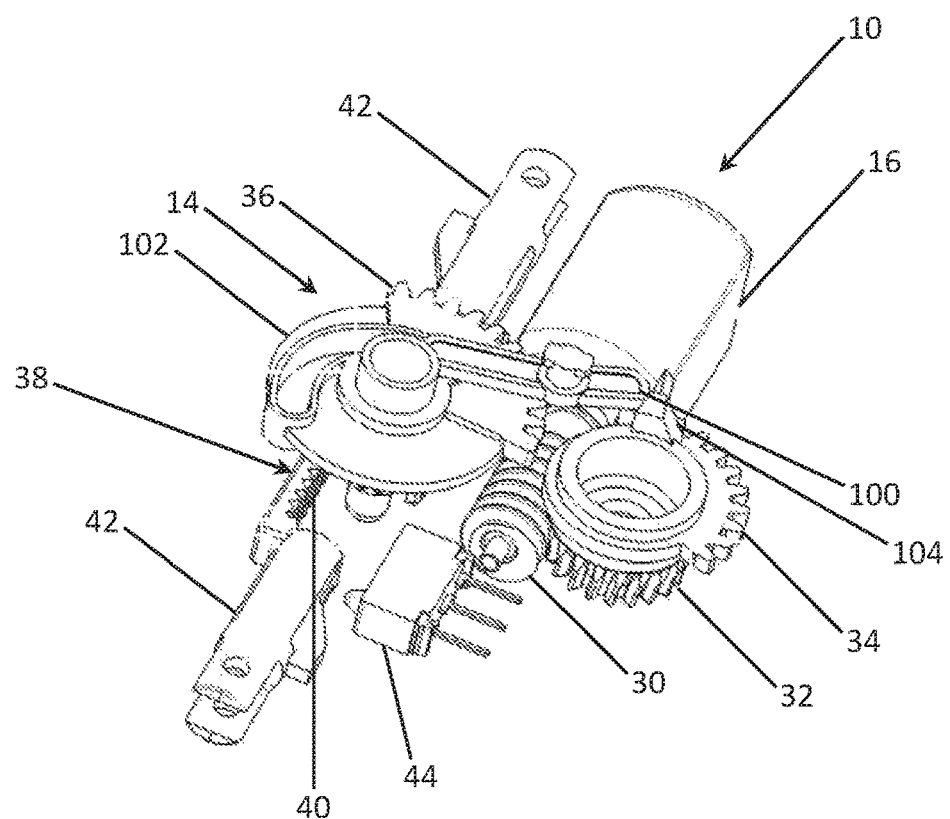

Referring now specifically to FIG. 9, in another exemplary embodiment, the housing 12 again includes an upper housing 12a and a lower housing 12b collectively disposed about the actuation mechanism 14. The coupler-actuator assembly 10 employs a simple DC electric motor 16, completely enclosed within the housing 12 in this case. A worm screw 30 is fixed on the shaft of the motor 16 and rotates when the motor 16 is actuated. The worm screw 30 is coupled to a corresponding worm gear 32 disposed on a shaft disposed substantially perpendicular to the worm screw 30. Thus, the worm screw 30 and worm gear 32 effectively decrease the rotational speed increase the torque of the motor 16 available to the actuation mechanism 14. An actuating gear sector 34 is disposed on the same shaft as the worm gear 32. The actuating gear sector 34 is only partially-toothed and performs one rotation per opening cycle. It should be noted that all of the components described herein may be manufactured from any suitable substantially rigid material, such as a metallic material, a plastic material, or the like.

The actuating gear sector 34 engages a corresponding receiving gear sector 36 when rotated. The receiving gear sector 36 is also only partially-toothed and is fixed on a common shaft with a synchronizing pinion 38. The receiving gear sector/pinion shaft is disposed substantially parallel to the actuating gear sector/worm gear shaft within the housing 12. As shown, the receiving gear sector 36 may be keyed and fitted on a corresponding keyed portion of the pinion 38. The pinion 38 also includes teeth at its center portion that engage corresponding teeth of a pair of slider racks 40 disposed adjacent to and about the pinion 38. Here, one slider rack 40 is disposed on each opposed side of the pinion 38, with the slider racks 40 simultaneously engaging the pinion 38. The slider racks 40 are ultimately coupled to the connecting rods 24 (FIG. 1) of the coupler-actuator assembly 10.

In operation, rotation of the worm screw 30 by the motor 16 rotates the worm gear 32 about the first axis, which rotates the actuating gear sector 34 about the first axis. This selectively rotates the receiving gear sector 36 about the second axis, due to the partially-toothed nature of both the actuating gear sector 34 and the receiving gear sector 36, which rotates the pinion 38 about the second axis. Rotation of the pinion 38 about the second axis translates the slider racks 40 in a direction into/out of the housing 12. As shown, the slider racks 40 each include a connecting rod engagement portion 42 that protrudes from or is enclosed within the housing 12 and is coupled to the corresponding connecting rod 24 via a pin attachment, for example. It will be readily apparent to those of ordinary skill in the art that slightly different gear and component arrangements and configurations can be utilized equally. For example, a linear motor could be utilized, as opposed to a rotational motor, requiring different gear and lever connections to be utilized.

Preferably, a sensor switch 44 is disposed within the housing 12 and coupled to one of the moving components of the actuation mechanism 14, such as one of the slider racks 40. This sensor switch 44 is operable for sensing a degree of movement of the moving component and thereby monitoring an actuation state of the actuation mechanism 14. Such sensing devices are well known to those of ordinary skill in the art and may include mechanical sensors, near-field electrical sensors, or the like, sensing relative or absolute translational or rotational motion or displacement. Here, a stop pawl 100 is used to prevent over-rotation due to inertia or the like, which could block free movement of the slider racks 40. The position of the stop pawl 100 is controlled by a cam slot 102 integrated into the receiving gear sector 36. When the receiving gear sector 36 is in its final position, the stop pawl 100 is engaged to contact a stop rib 104 integrated into the actuating gear sector 34.

Figure 10:
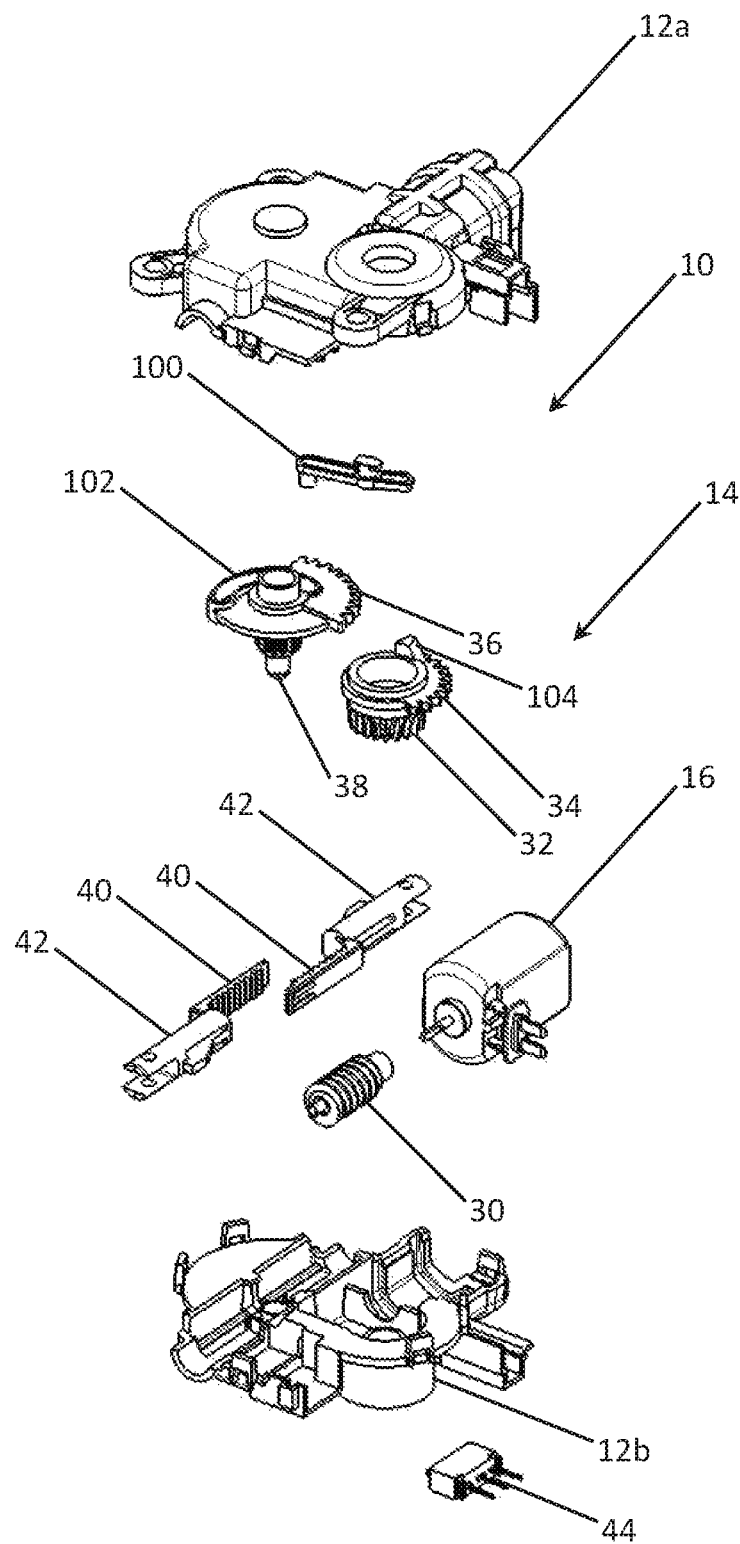
FIG. 10 is an exploded perspective view of another exemplary embodiment of the coupler-actuator assembly for a powered latch system of the present disclosure.

Referring now specifically to FIG. 10, in a more clear exploded view, the housing 12 again includes an upper housing 12a and a lower housing 12b collectively disposed about the actuation mechanism 14. The coupler-actuator assembly 10 employs a simple DC electric motor 16, completely enclosed within the housing 12 in this case. A worm screw 30 is fixed on the shaft of the motor 16 and rotates when the motor 16 is actuated. The worm screw 30 is coupled to a corresponding worm gear 32 disposed on a shaft disposed substantially perpendicular to the worm screw 30. Thus, the worm screw 30 and worm gear 32 effectively decrease the rotational speed increase the torque of the motor 16 available to the actuation mechanism 14. An actuating gear sector 34 is disposed on the same shaft as the worm gear 32, which components may be integrally formed. The actuating gear sector 34 is only partially-toothed and performs one rotation per opening cycle. It should be noted that all of the components described herein may be manufactured from any suitable substantially rigid material, such as a metallic material, a plastic material, or the like.

The actuating gear sector 34 engages a corresponding receiving gear sector 36 when rotated. The receiving gear sector 36 is also only partially-toothed and is fixed on a common shaft with a synchronizing pinion 38, which components may be integrally formed. The receiving gear sector/pinion shaft is disposed substantially parallel to the actuating gear sector/worm gear shaft within the housing 12. As shown, the receiving gear sector 36 may be keyed and fitted on a corresponding keyed portion of the pinion 38. The pinion 38 also includes teeth at its center portion that engage corresponding teeth of a pair of slider racks 40 disposed adjacent to and about the pinion 38. Here, one slider rack 40 is disposed on each opposed side of the pinion 38, with the slider racks 40 simultaneously engaging the pinion 38. The slider racks 40 are ultimately coupled to the connecting rods 24 (FIG. 1) of the coupler-actuator assembly 10.

In operation, rotation of the worm screw 30 by the motor 16 again rotates the worm gear 32 about the first axis, which rotates the actuating gear sector 34 about the first axis. This selectively rotates the receiving gear sector 36 about the second axis, due to the partially-toothed nature of both the actuating gear sector 34 and the receiving gear sector 36, which rotates the pinion 38 about the second axis. Rotation of the pinion 38 about the second axis translates the slider racks 40 in a direction into/out of the housing 12. As shown, the slider racks 40 each include a connecting rod engagement portion 42 that protrudes from or is enclosed within the housing 12 and is coupled to the corresponding connecting rod 24 via a pin attachment, for example. It will be readily apparent to those of ordinary skill in the art that slightly different gear and component arrangements and configurations can be utilized equally. For example, a linear motor could be utilized, as opposed to a rotational motor, requiring different gear and lever connections to be utilized.

Preferably, a sensor switch 44 is again disposed within the housing 12 and coupled to one of the moving components of the actuation mechanism 14, such as one of the slider racks 40. This sensor switch 44 is operable for sensing a degree of movement of the moving component and thereby monitoring an actuation state of the actuation mechanism 14. Such sensing devices are well known to those of ordinary skill in the art and may include mechanical sensors, near-field electrical sensors, or the like, sensing relative or absolute translational or rotational motion or displacement. Again, a stop pawl 100 is used to prevent over-rotation due to inertia or the like, which could block free movement of the slider racks 40. The position of the stop pawl 100 is controlled by a cam slot 102 integrated into the receiving gear sector 36. When the receiving gear sector 36 is in its final position, the stop pawl 100 is engaged to contact a stop rib 104 integrated into the actuating gear sector 34.

Figure 11:
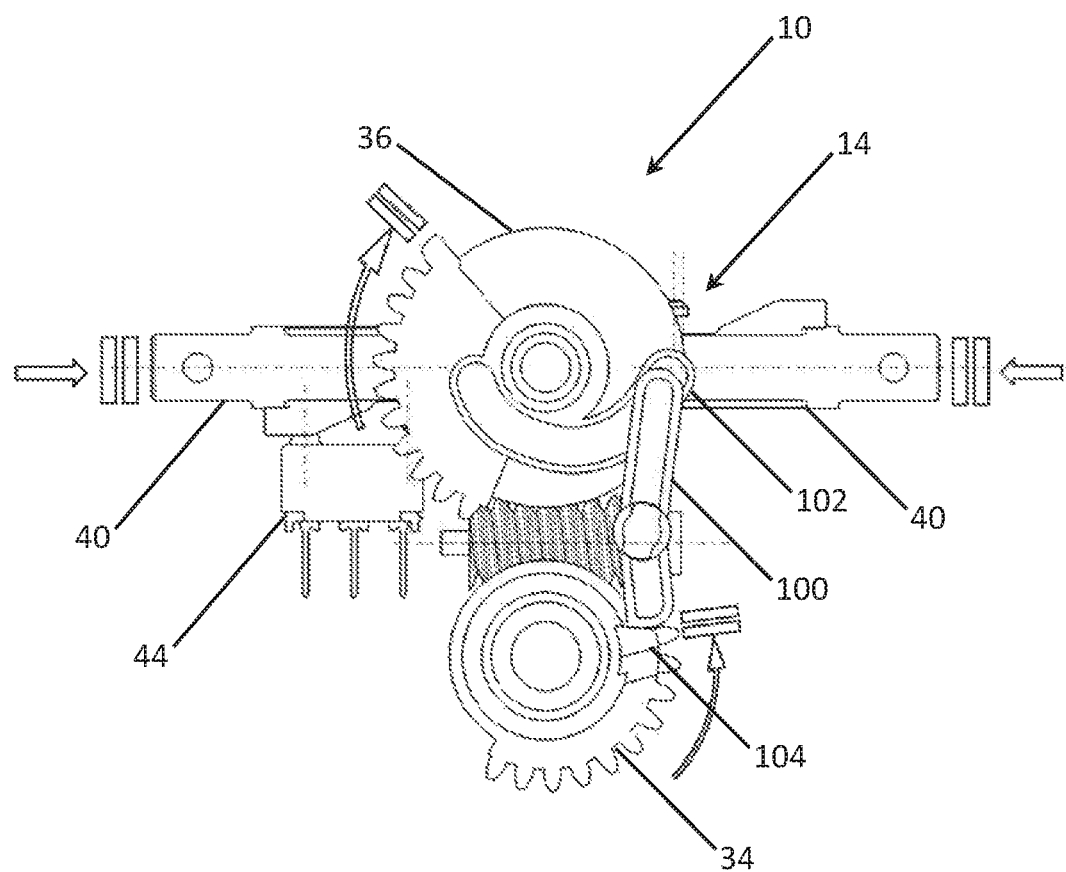
FIG. 11 is a partial top planar view of another exemplary embodiment of the coupler-actuator assembly for a powered latch system of the present disclosure, in final actuated state.

Referring now specifically to FIG. 11, the actuation mechanism 14 starts in a normal (latched) position with the slider racks 40 extended. The motor 16 (FIGS. 9 and 10) is not powered up and the sensor switch 44 is in an open state. The motor 16 is then powered up after a signal from the opening control (i.e., a sensor switch in the handle, push button, knob, or the like). The actuating gear sector 34 rotates until it engages the receiving gear sector 36. Further rotation of the actuating gear sector 34 is accompanied by a rotation of the receiving gear sector 36 (as they are meshed together). That, in turn, causes the pinion 38 (FIGS. 9 and 10) rotation and initiates the slider rack displacements. After rotating a predefined angle, the actuating gear sector 34 disengages from the receiving gear sector 36. The slider racks 40 are now very close to their final, unlatched positions and the sensor switch 44 is about to be closed. The sensor switch is pressed closed by a cam integrated on the slider rack 40 and the signal is read by the electronic control unit (ECU) and the power to the motor 16 is cut. At the same time, the stop pawl 100 is rotated by the cam slot 102 in such a manner that it moves into the trajectory of the stop rib 104. Finally, the receiving gear sector 36 is disengaged from the actuating gear sector 34. The slider racks 40 move the last part of their travel and stop. This movement is helped by a force from the latching assemblies 22 (FIG. 1) settling in their unlatched positions. The sensor switch 44 is now closed and the power to the motor 16 is cut. The motor and the actuating gear sector 34 rotate due to inertia. This rotation is slowed by friction in the system. If the sector does not stop before completing a full rotation, it is stopped by the stop pawl 100 catching the stop rib 104.

Again, from an operational standpoint, the actuation provided is very fast (below 500 ms) and there is no need for resetting the position of the motor 16 (FIGS. 1-3) or any other components. This results in reduced operating noise duration, providing more of an "acoustic confirmation" than a "mechanical operating noise." This system function is more reliable than systems with arbitrary power supply timing. Indirectly, this also provides a minimized packaging volume and a maximized storage compartment volume.

Figure 12:
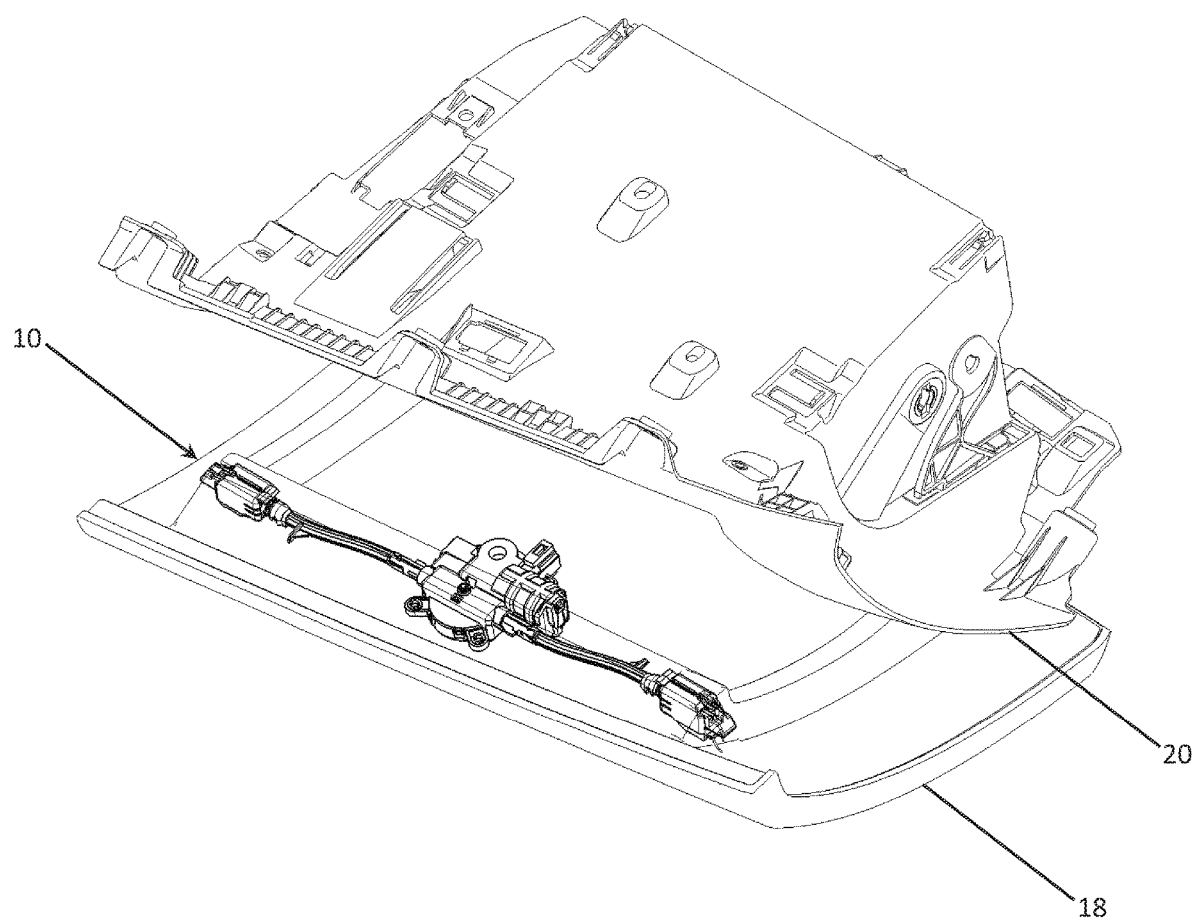
FIG. 12 is a perspective view of the coupler-actuator assembly of the present disclosure installed in a hatch lid of a vehicle.
Figure 13:
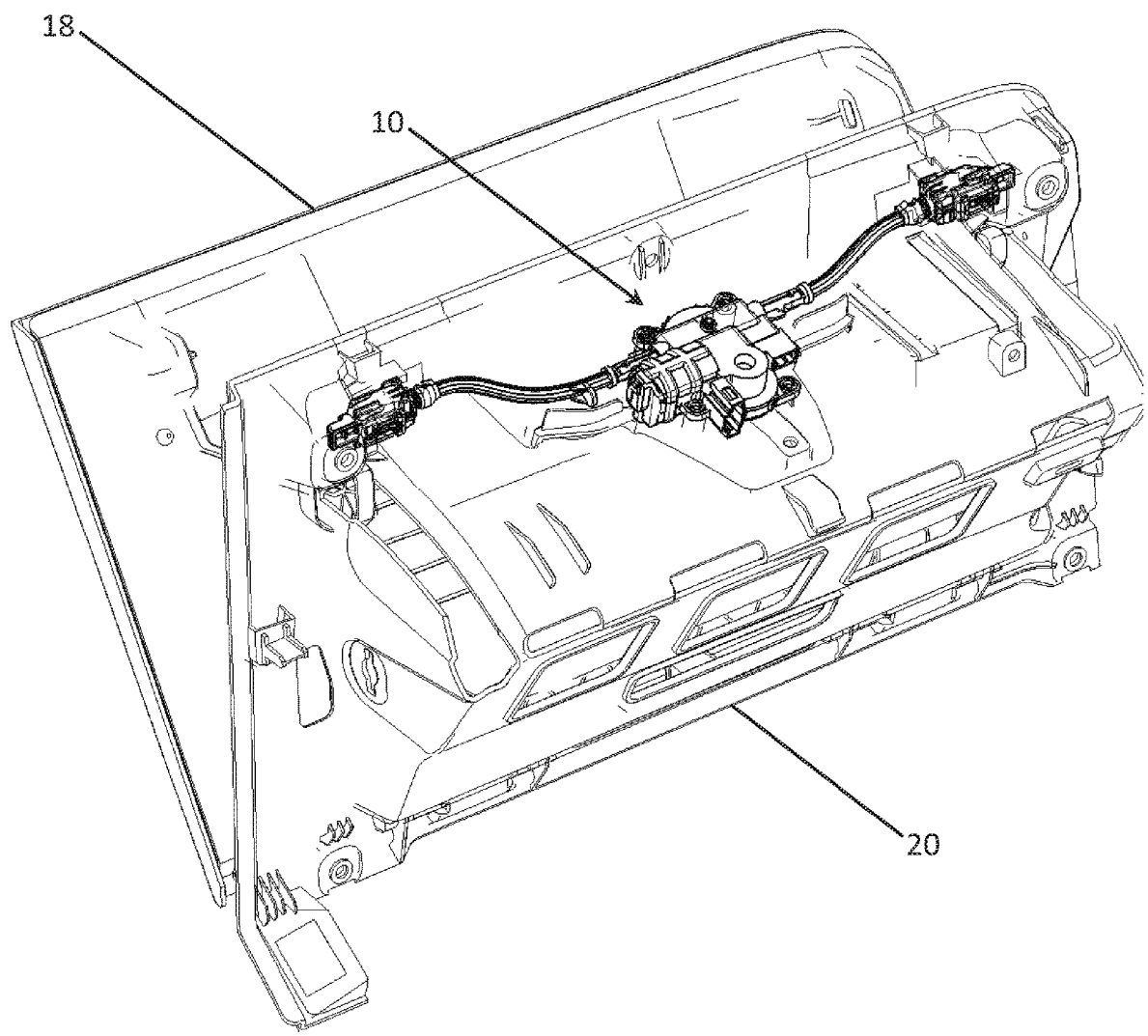
FIG. 13 is a perspective view of the coupler-actuator assembly of the present disclosure installed in a storage compartment of a vehicle.

FIG. 12 is a perspective view of the coupler-actuator assembly of the present disclosure installed in a hatch lid of a vehicle, while FIG. 13 is a perspective view of the coupler-actuator assembly of the present disclosure installed in a storage compartment of a vehicle.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A coupler-actuator assembly in combination with a powered latch system of a hatch lid of a storage compartment of a vehicle, the coupler-actuator assembly comprising:
   a housing adapted to be disposed partially or wholly within and coupled to the hatch lid or within the storage compartment;
   a motor disposed partially or wholly within and coupled to the housing;
   an actuation mechanism disposed within the housing and coupled to the motor, wherein the actuation mechanism comprises a plurality of gear sectors, each of which is only partially-toothed in one complete rotation of itself; and
   one or more slider racks disposed partially or wholly within the housing and coupled to the actuation mechanisms;
   wherein the actuation mechanism further comprises;
   a worm screw coupled to the motor;
   a worm gear coupled to the worm screw;
   wherein the plurality of gear sectors comprises an actuating gear sector coupled to the worm gear along a common axis and a receiving gear sector adapted to be coupled to the actuating gear sector; and
   a synchronizing pinion coupled to the receiving gear sector along another common axis and coupled to the one or more slider racks;
   wherein rotation of the worm screw by the motor rotates the worm gear about the common axis, which rotates the actuating gear sector about the common axis, which selectively rotates the receiving gear sector about the other common axis, which selectively rotates the synchronizing pinion about the other common axis, which selectively translates the one or more slider racks in a direction into or out of the housing.

2. The coupler-actuator assembly in combination with the powered latch system of claim 1, further comprising one or more connecting rods disposed outside of or partially within the housing and coupled to the one or more slider racks, wherein the one or more connecting rods are adapted to be disposed adjacent to or partially or wholly within the hatch lid or the storage compartment.

3. The coupler-actuator assembly in combination with the powered latch system of claim 2, wherein the powered latch system comprises one or more latch assemblies disposed outside of the housing and coupled to the one or more connecting rods, wherein the one or more latch assemblies are adapted to be disposed adjacent to or partially or wholly within and coupled to the hatch lid or the storage compartment, wherein, when actuated, the one or more latch assemblies are adapted to release the hatch lid from or to secure the hatch lid to the storage compartment.

4. The coupler-actuator assembly in combination with the powered latch system of claim 3, wherein the one or more slider racks comprises a pair of connected slider racks, the one or more connecting rods comprises a pair of opposed connecting rods, each coupled to a corresponding one of the pair of connected slider racks within the housing, and the one or more latch assemblies comprises a pair of opposed latch assemblies, each coupled to a corresponding one of the pair of opposed connecting rods outside of the housing.

5. The coupler-actuator assembly in combination with the powered latch system of claim 1, further comprising a sensor disposed within the housing and operable for sensing an actuation state of the actuation mechanism.

6. A hatch lid assembly for a storage compartment of a vehicle, the hatch lid assembly comprising:
   a hatch lid; and
   a coupler-actuator assembly, comprising:
      a housing disposed partially or wholly within and coupled to the hatch lid;
      a motor disposed partially or wholly within and coupled to the housing;
      an actuation mechanism disposed within the housing and coupled to the motor, wherein the actuation mechanism comprises a plurality of gear sectors, each of which is only partially-toothed in one complete rotation of itself; and
      one or more slider racks disposed partially or wholly within the housing and coupled to the actuation mechanism;
      wherein the actuation mechanism further comprises;
      a worm screw coupled to the motor;
      a worm gear coupled to the worm screw;

wherein the plurality of gear sectors comprises an actuating gear sector coupled to the worm gear along a common axis and a receiving gear sector adapted to be coupled to the actuating gear sector; and a synchronizing pinion coupled to the receiving gear sector along another common axis and coupled to the one or more slider racks;

wherein rotation of the worm screw by the motor rotates the worm gear about the common axis, which rotates the actuating gear sector about the common axis, which selectively rotates the receiving gear sector about the other common axis, which selectively rotates the synchronizing pinion about the other common axis, which selectively translates the one or more slider racks in a direction into or out of the housing.

7. The hatch lid assembly of claim 6, wherein the coupler-actuator assembly further comprises one or more connecting rods disposed outside of or partially within the housing and coupled to the one or more slider racks, wherein the one or more connecting rods are disposed adjacent to or partially or wholly within the hatch lid.

8. The hatch lid assembly of claim 7, further comprising one or more latch assemblies disposed outside of the housing and coupled to the one or more connecting rods, wherein the one or more latch assemblies are disposed adjacent to or partially or wholly within and coupled to the hatch lid, wherein, when actuated, the one or more latch assemblies are adapted to release the hatch lid from or to secure the hatch lid to the storage compartment.

9. The hatch lid assembly of claim 8, wherein the one or more slider racks comprises a pair of connected slider racks, the one or more connecting rods comprises a pair of opposed connecting rods, each coupled to a corresponding one of the pair of connected slider racks within the housing, and the one or more latch assemblies comprises a pair of opposed latch assemblies, each coupled to a corresponding one of the pair of opposed connecting rods outside of the housing.

10. The hatch lid assembly of claim 6, wherein the coupler-actuator assembly further comprises a sensor disposed within the housing and operable for sensing an actuation state of the actuation mechanism.

11. A storage compartment assembly for a vehicle, the storage compartment assembly comprising:
a storage compartment;
a hatch lid pivotably or removably coupled to the storage compartment; and
a coupler-actuator assembly, comprising:
a housing disposed partially or wholly within and coupled to the storage compartment;
a motor disposed partially or wholly within and coupled to the housing;
an actuation mechanism disposed within the housing and coupled to the motor, wherein the actuation mechanism comprises a plurality of gear sectors, each of which is only partially-toothed in one complete rotation of itself; and
one or more slider racks disposed partially or wholly within the housing and coupled to the actuation mechanism;
wherein the actuation mechanism further comprises;
a worm screw coupled to the motor;
a worm gear coupled to the worm screw;
wherein the plurality of gear sectors comprises an actuating gear sector coupled to the worm gear along a common axis and a receiving gear sector adapted to be coupled to the actuating gear sector; and
a synchronizing pinion coupled to the receiving gear sector along another common axis and coupled to the one or more slider racks;
wherein rotation of the worm screw by the motor rotates the worm gear about the common axis, which rotates the actuating gear sector about the common axis, which selectively rotates the receiving gear sector about the other common axis, which selectively rotates the synchronizing pinion about the other common axis, which selectively translates the one or more slider racks in a direction into or out of the housing.

12. The storage compartment assembly of claim 11, wherein the coupler-actuator assembly further comprises one or more connecting rods disposed outside of or partially within the housing and coupled to the one or more slider racks, wherein the one or more connecting rods are disposed adjacent to or partially or wholly within the hatch lid or the storage compartment.

13. The storage compartment assembly of claim 12, further comprising one or more latch assemblies disposed outside of the housing and coupled to the one or more connecting rods, wherein the one or more latch assemblies are disposed adjacent to or partially or wholly within and coupled to the hatch lid or the storage compartment, wherein, when actuated, the one or more latch assemblies are adapted to partially or wholly release the hatch lid from or to secure the hatch lid to the storage compartment.

14. The storage compartment assembly of claim 13, wherein the one or more slider racks comprises a pair of connected slider racks, the one or more connecting rods comprises a pair of opposed connecting rods, each coupled to a corresponding one of the pair of connected slider racks within the housing, and the one or more latch assemblies comprises a pair of opposed latch assemblies, each coupled to a corresponding one of the pair of opposed connecting rods outside of the housing.

15. The storage compartment assembly of claim 11, wherein the coupler-actuator assembly further comprises a sensor disposed within the housing and operable for sensing an actuation state of the actuation mechanism.

* * * * *